Oct. 20, 1931.  P. MAIWURM  1,828,253
AIRCRAFT CONTROL MECHANISM
Filed July 29, 1929
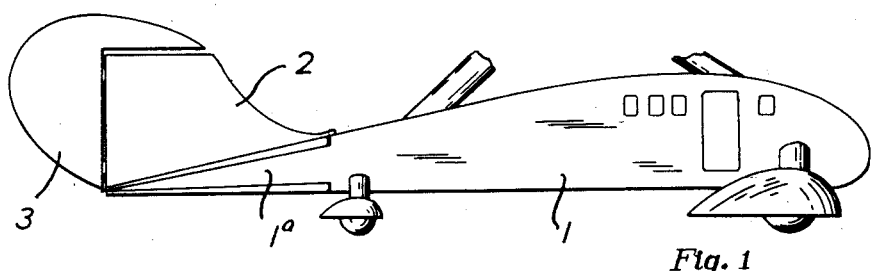
Fig. 1
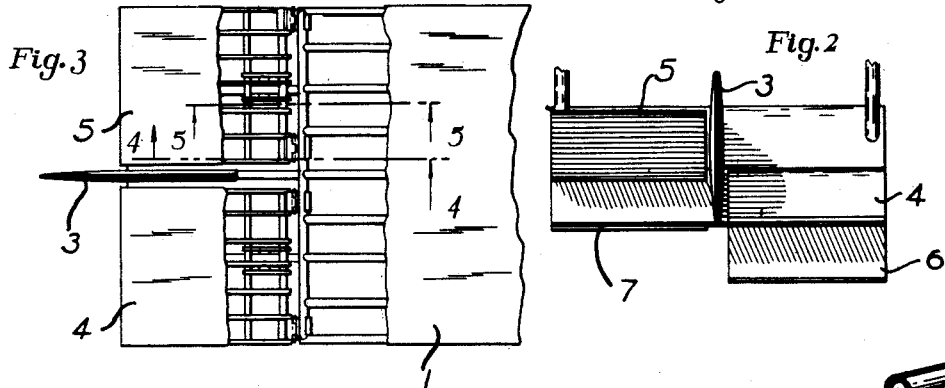
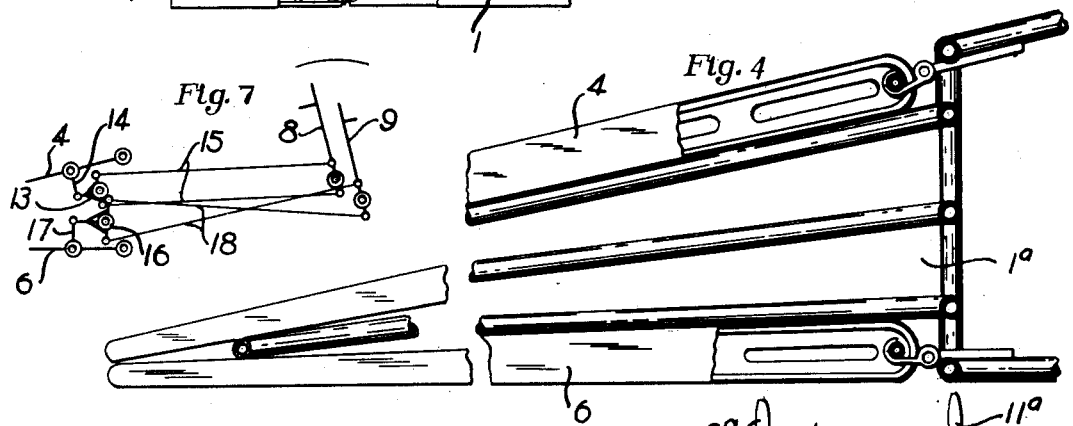
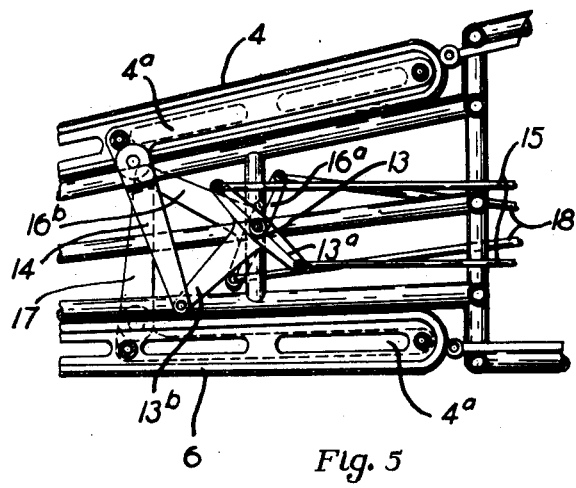
Fig. 5
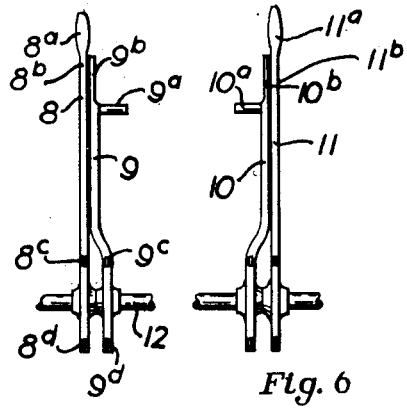
Fig. 6
INVENTOR.
PAUL MAIWURM
BY A. B. Bowman
ATTORNEY.

Patented Oct. 20, 1931

1,828,253

UNITED STATES PATENT OFFICE

PAUL MAIWURM, OF SAN DIEGO, CALIFORNIA

AIRCRAFT CONTROL MECHANISM

Application filed July 29, 1929. Serial No. 381,710.

My invention relates to aircraft control mechanisms and the objects of my invention are: First, to provide an aircraft control mechanism which combines the aileron and elevator surfaces within a limited space; second, to provide aileron and elevator surfaces which are mounted in superposed relation; third, to provide control means enabling the individual and joint adjustment of aileron and elevator; fourth, to provide a plurality of individually and jointly operable control levers; fifth, to provide pairs of control levers so mounted that either one or both may be readily operated by a single hand of the aviator; sixth, to provide a fuselage structure extending to the outer margin of the ailerons and elevators, and seventh, to provide superposed aileron and elevator surfaces which are adapted to be swung simultaneously in opposite directions for causing a reduction in speed of the aircraft when in flight.

With these and other objects in view as will appear hereinafter, my invention consists of certain novel features of construction, combination and arrangement of parts and portions as will be hereinafter described and particularly set forth in the appended claims, reference being had to the accompanying drawings and to the characters of reference thereon which form a part of this application in which:

Figure 1 is a side elevational view of the fuselage incorporating the novel control mechanism and forming a part of the aircraft described in my co-pending application Serial No. 281,908; Fig. 2 is a rear end view of the fuselage showing the upper left hand controlling surface raised and the lower right hand controlling surface lowered; Fig. 3 is a plan view of the tail structure with certain portions broken away in order to facilitate the illustration of certain parts of the controlling mechanism; Fig. 4 is a fragmentary sectional view taken along the line 4—4 of Fig. 3; Fig. 5 is an enlarged fragmentary sectional view taken along the line 5—5 of Fig. 3; Fig. 6 is an elevational view of the hand control lever, and Fig. 7 is a diagrammatical view showing the connection of the control lever with the control surfaces.

Similar characters of reference refer to similar parts and portions throughout the several views of the drawings.

The fuselage 1, fin 2, rudder 3, control surfaces 4, 5, 6 and 7, control levers 8, 9, 10 and 11, shaft 12, rocker arms 13 and 16, links 14 and 17, and control cables 15 and 18, form the principal parts and portions of my invention.

The fuselage 1 is made preferably of a height sufficient to serve as the cabin for the aircraft and in its side outline simulates a typical wing section, extending in tapered form to the outer edge of the tail member. The rear end portion 1a is stepped slightly inwardly, forming space for the control surfaces 4, 5, 6 and 7, the outer faces of which are substantially alined with the upper and lower surfaces of the fuselage. All outer surfaces of the fuselage including the rear portion 1a are covered forming a smooth outer surface.

The control surfaces are substantially rectangular in shape and are hinged at their forward edges to the fuselage 1 at the stepped portion 1a thereof. They are mounted in pairs on the upper and lower sides and to either side of the center line of the fuselage. A vertical fin 2 extends lengthwise with the center line over the stepped portion 1a and a conventional rudder 3 is suitably hinged to the rear of the fin 2.

A pair of identical rocker arms 13 and 16 are pivotally mounted within the tail end portion 1a of the fuselage on either side of the center line, their axes being substantially in alinement, each pair being substantially opposite the longitudinal median line of the upper and lower controlling surfaces 4, 6, 5 and 7.

The rocker arm 13 comprises a centrally pivoted arm 13a to the end of which are connected the control cable 15 and a substantially right angularly extending integral arm 13b to the end of which a link 14 is connected at its outer end.

The link 14 is pivotally mounted at its inner end to the reinforcing member 4a which is rigidly secured to the control surface 4, as best shown in Fig. 5. An identical mechanism is provided for controlling the adjacent surface 5. The lower controlling surfaces 6 and 7 are likewise manipulated by link and cable mechanism of the same description. Thus in Fig. 5 the controlling surface 6 is shown as provided with the pivotally mounted link 17 which is pivotally secured to the end of the arm 16*b* of the rocker arm 16 and the ends of the thereto right angularly related arm 16*a* are connected by means of the cable 18 to the respective control levers. Each controlling surface is manipulated by means of an independently operable control lever. These levers, of which there are four, designated 8, 9, 10 and 11, are mounted within the cockpit (not shown in the drawings), which is positioned within the fuselage 1.

As indicated in Fig. 6 the control levers are mounted in pairs on a common shaft 12, the pairs being positioned in spaced relation forward of the pilot so that the levers may be individually or simultaneously operated by the pilot, either singly or in pairs. To facilitate this, the two outwardly positioned levers 8 and 11 are made longer than the inwardly positioned levers 9 and 10, the projecting ends 8*a* and 11*a* of the levers 8 and 11 being formed as handgrips. The outer end portion of the lever 9 lies close to the lever 8 when the two levers occupy the same angular position, forming a common hand grip 8*b* and 9*b*, so that the pilot can readily grasp both levers with a single hand in order to manipulate the corresponding controlling surfaces simultaneously. A laterally extending hand grip 9*a* is provided for enabling the lever 9 to be independently operated.

Similarly, the levers 10 and 11 are provided with the individual hand grips 10*a* and 11*a* and the jointly formed grips 10*b* and 11*b*, providing for individual and simultaneous operation of the therewith related controlling surfaces.

Each lever is extended below the shaft 12 on which it is mounted and is provided with a pair of eyes positioned one above and one below the axis of the shaft 12, to which the end of the corresponding cables are connected. Thus, cable 15 is connected to the eyes 8*c* and 8*d*, while cable 18 is connected to the eyes 9*c* and 9*d*.

In order to obtain the correct relation of movement of the corresponding controlling surfaces 4 and 6, the cable 18 is crossed, as clearly shown in the diagrammatical Fig. 7. The cable connections between the levers 10 and 11 and the control surfaces 5 and 7 are identical with those described in the foregoing, so that corresponding manipulation of the levers 10 and 11 effect identical movement of the controlling surfaces therewith connected as in the case of the levers 8 and 9.

Referring to the diagram Fig. 7, movement of the lever 8 in the direction of the arrow will cause the control surface 4 to be lowered so as to rest against the upper surface of the tail portion 1*a*. The reverse movement of the lever 8 will cause the upper surface 4 to be raised. Movement of the lever 11 will effect identical movement of the control surface 5. With the levers 9 and 10 moved in the direction of the arrow, the therewith connected control surfaces 6 and 7 are brought into position against the lower surface of the tail portion 1*a* and movement of these levers in the opposite direction will cause them to be swung downwardly into the position indicated in dotted lines in Fig. 1. When operated in this manner, the control surfaces obviously function as elevators.

Pushing forward simultaneously on levers 8 and 11 will swing the control surfaces 4 and 5 upwardly and cause the aircraft to rise, while moving the levers 9 and 10 forward simultaneously will swing the lower surfaces 6 and 7 downwardly and cause the aircraft to head downwardly. When the levers all occupy the rearward position, that is, the position in which the controlling surfaces all lie against the tail portion 1*a*, they merely act as the stabilizer for the aircraft. Simultaneous forward movement of the levers 8 and 10 or levers 9 and 11 will cause the upper surface on one side of the rudder and the lower surface on the opposite side of the rudder to be swung respectively upwardly and downwardly. In this case the control surfaces function as ailerons and are used in this manner when it is desired to bank the aircraft in one direction or in the other. If desired, the operation of the rudder may be effected at the same time by means of conventional control, not shown in the drawings.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a device of the class described, the combination with a fuselage having a relatively wide, wedge shaped tail portion, of a plurality of controlling surfaces hinged at their forward edges to said fuselage above and below said tail portion and adapted to lie contiguous therewith and flush with the adjoining fuselage surfaces, and means for manipulating each controlling surface independently.

2. In a device of the class described, a fuselage merging into a relatively broad, wedge shaped tail portion, the upper and lower surfaces thereof being stepped inwardly, a plurality of control surfaces hinged at the line of said steps and adapted to lie on the upper and lower surface of said tail portion and flush with the adjoining fuselage surfaces, and means for manipulating said control surfaces.

3. In a device of the class described, a fuselage having relatively broad, converging upper and lower surfaces, said surfaces being stepped inwardly at their rear end, forming a substantially wedge shaped tail portion of substantially rectangular plan, control surfaces hinged at the line of said steps, one on each side of the longitudinal axis of the fuselage on the upper and lower surfaces of said tail portion, and means for operating said control surfaces as elevators and as ailerons.

4. In a device of the class described, a fuselage, a plurality of control surfaces pivotally mounted respectively on the upper and lower rear portions of said fuselage and forming with their outer surfaces alinement with the upper and lower surfaces of said fuselage, means for independently swinging the lower control surfaces downwardly for causing an upward movement of the tail portion, means for independently swinging the upper control surfaces upwardly for causing downward movement of the tail portion and means simultaneously for actuating certain upper and lower control surfaces for causing a banking movement of said fuselage.

5. In a device of the class described, a fuselage, a plurality of superposed control surfaces pivotally mounted in spaced apart relation at the tail portion of said fuselage and in substantial alinement respectively with the upper and lower surfaces thereof, rocker arm means pivotally mounted in said tail portion, link means individually connecting said rocker arms with said control surfaces, a plurality of pairs of control levers, means for operatively connecting said levers with said rocker arms, the levers of each pair being operable by the one hand of an aviator either individually or together.

6. In combination, two pairs of control surfaces individually pivotally mounted on an aircraft, two pairs of controlling levers each lever operatively connected with one of said control surfaces, each lever having an individual hand grip and each pair of levers forming a joint hand grip for enabling joint manipulation by the one hand of an aviator, whereby said control surfaces may be paired to operate either as elevators or ailerons and operated simultaneously as braking means for reducing the speed of the aircraft.

In testimony whereof, I have hereunto set my hand at San Diego, California, this 19th day of July, 1929.

PAUL MAIWURM.